(12) United States Patent
Yano

(10) Patent No.: US 7,400,338 B2
(45) Date of Patent: Jul. 15, 2008

(54) IMAGE FORMING APPARATUS WITH TEMPERATURE DETECTION

(75) Inventor: Hidetoshi Yano, Tokai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 173 days.

(21) Appl. No.: 11/224,937

(22) Filed: Sep. 14, 2005

(65) Prior Publication Data

US 2006/0066713 A1    Mar. 30, 2006

(30) Foreign Application Priority Data

Sep. 28, 2004  (JP) .............................. 2004-281928

(51) Int. Cl.
  *B41J 15/14*  (2006.01)
  *B41J 27/00*  (2006.01)
(52) U.S. Cl. ........................ 347/243; 347/259; 347/260; 347/261
(58) Field of Classification Search ................. 347/231, 347/243, 259–261
  See application file for complete search history.

(56) References Cited

U.S. PATENT DOCUMENTS 4,807,156 A * 2/1989 Parisi ........................ 358/1.2
6,400,384 B1 * 6/2002 Kuwabara .................... 347/129
6,853,816 B2 * 2/2005 Miyata ........................ 399/46

FOREIGN PATENT DOCUMENTS

| JP | 55087122 A | * | 7/1980 |
| JP | 10082965 A | * | 3/1998 |
| JP | 2003-066812 |   | 3/2003 |

* cited by examiner

*Primary Examiner*—Hai C Pham
(74) *Attorney, Agent, or Firm*—Banner & Witcoff, Ltd.

(57) ABSTRACT

An image forming apparatus including: an optical scanning unit for deflecting and scanning a light on a photosensitive body, the optical scanning unit having: a light source for emitting the light; a deflection section that deflects the emitted light; a driving section that drives the deflection section; and a temperature detecting section that detects the temperature of the driving section or the temperature in vicinity of the driving section; a developing section that develops an electrostatic latent image by depositing a developer on the electrostatic latent image formed on a surface of the photosensitive body by the optical scanning unit; a transfer section that transfers the developer deposited on the surface of the photosensitive body to a recording medium; and a controller for changing a drive speed of the driving section based on the temperature detected by the temperature detecting section.

13 Claims, 5 Drawing Sheets

IMAGE FORMING APPARATUS WITH TEMPERATURE DETECTION

BACKGROUND OF THE INVENTION

1. Field of the Invention

The present invention relates to an image forming apparatus for forming an image on a recording medium, and more particularly to an image forming apparatus of so-called electrophotographic method for forming an image by forming an electrostatic latent image on the surface of a photosensitive body, depositing a developer on the electrostatic latent image and transferring it onto the recording medium.

2. Description of the Related Art

Conventionally, an image forming apparatus has been provided, including an photosensitive body, an optical scanning unit for deflecting and scanning a light on the photosensitive body to form an electrostatic latent image on the surface of the photosensitive body, a developing section for developing the electrostatic latent image by depositing a developer on the electrostatic latent image formed on the surface of the photosensitive body by the optical scanning unit, and a transfer section for transferring the developer deposited on the surface of the photosensitive body by the developing section to the recording medium. In the image forming apparatus of this type, the electrostatic latent image is formed on the surface of the photosensitive body by deflecting and scanning the light, and developed by the developing section depositing the developer on the electrostatic latent image. The transfer section transfers the developer deposited on the surface of the photosensitive body onto the recording medium, whereby the image according to the deflecting and scanning is formed on the recording medium by the so-called electrophotographic method.

The well known optical scanning unit forms an electrostatic latent image according to the image data on the surface of the photosensitive body by emitting and deflecting the light to a polygon mirror driven and rotated by a polygon motor, and by making the emitted light intermittent according to the image data.

In recent years, in such image forming apparatus, the rotation speed of the polygon mirror is increased along with the higher image formation speed. Therefore, there is possibility that the temperature within the optical scanning unit rises excessively. It is conceivable to cool the polygon motor by a fan. However, if the fan is provided, the size and cost of the apparatus are increased, with the great noise produced. Therefore, it is desired to make the apparatus silent and reduce the cost by eliminating the fan, if possible. It has been proposed that when a certain number of sheets are printed successively, for example, the sheet feed interval is increased to drive the polygon motor at low speed (e.g., refer to JP-A-2003-66812).

SUMMARY OF THE INVENTION

However, when the continuous printing is controlled depending on whether or not the number of sheets reaches a prescribed number, the image formation cannot be performed fast in some cases, because the drive speed is reduced even when the temperature of the polygon mirror does not rise too much. Conversely, when the outside air temperature is high and the temperature of the polygon mirror rises quickly, there is possibility that the polygon mirror reaches a high temperature before the certain number of sheets are printed successively.

The present invention provides an image forming apparatus in which a driving section for driving a deflection section for deflecting the light is effectively prevented from being superheated without slowing it down unnecessarily.

According to an aspect of the present invention, there is provided an image forming apparatus including: a photosensitive body; an optical scanning unit for deflecting and scanning a light on the photosensitive body to form an electrostatic latent image on a surface of the photosensitive body, the optical scanning unit including: a light source for emitting the light; a deflection section that deflects the emitted light; a driving section that drives the deflection section; and a temperature detecting section that detects the temperature of the driving section or the temperature in vicinity of the driving section; a developing section that develops the electrostatic latent image by depositing a developer on the electrostatic latent image formed on the surface of the photosensitive body by the optical scanning unit; a transfer section that transfers the developer deposited on the surface of the photosensitive body by the developing section to a recording medium; and a controller for changing a drive speed of the driving section based on the temperature detected by the temperature detecting section.

In the invention as constituted above, the driving section drives the deflection section to deflect the light emitted from the light source and scan the light on the surface of the photosensitive body. Also, the temperature detecting section detects the temperature of the driving section or the temperature near the driving section, and the controller changes the drive speed of the driving section based on the temperature detected by the temperature detecting section.

Therefore, when the temperature of the driving section rises, the controller reduces the drive speed of the driving section to prevent the driving section from being superheated and impaired. Also, since the controller changes the speed of the driving section depending on the actual temperature of the driving section, the speed of the driving section is reduced only when the deceleration is practically required, whereby the image formation is sped up by driving the driving section at high speed.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
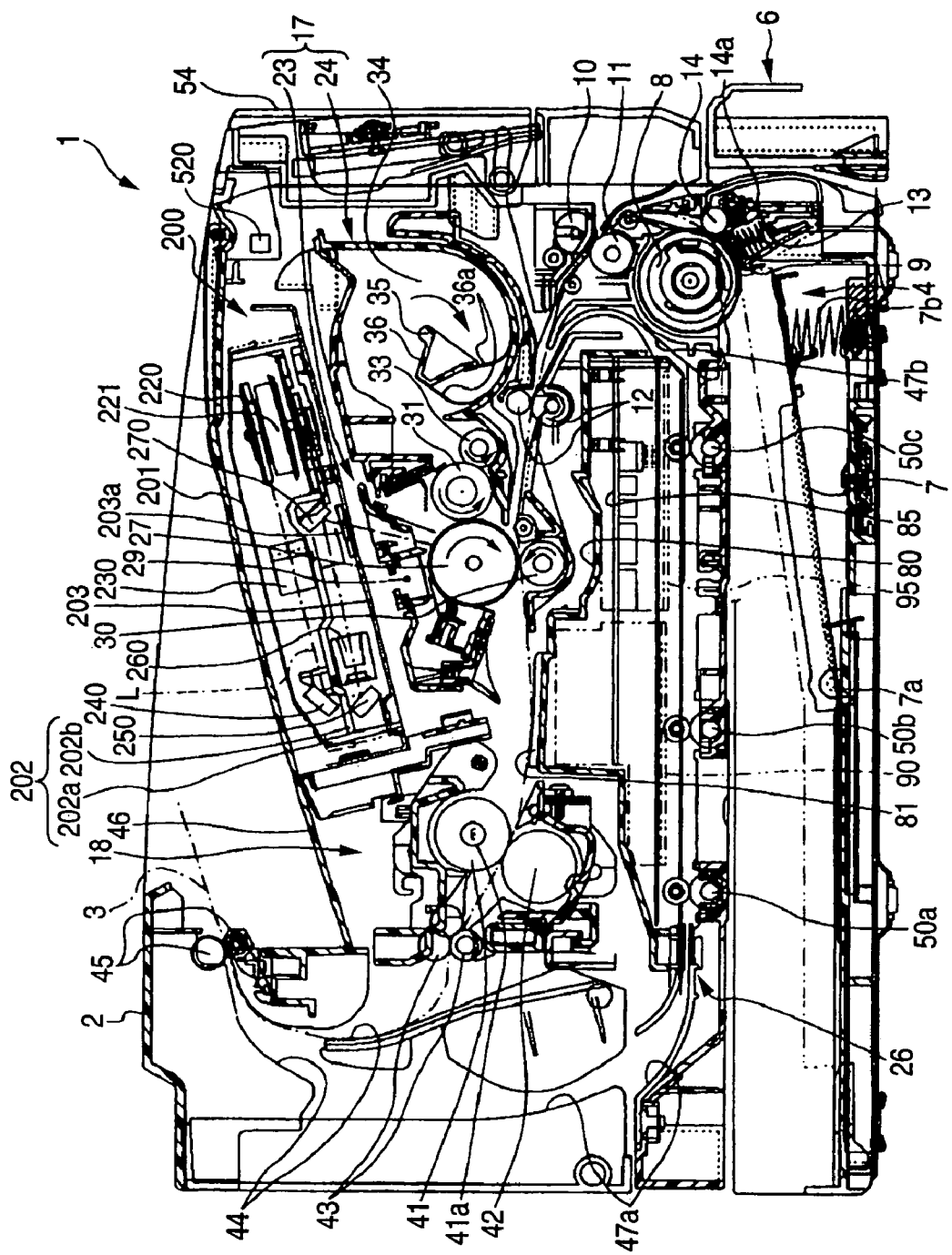
FIG. 1 is a side cross-sectional view showing the constitution of a laser printer according to an embodiment of the present invention.

An embodiment of the present invention will be described below with reference to the accompanying drawings. FIG. 1 is a side cross-sectional view showing the constitution of a laser printer 1 as an image forming apparatus to which the invention is applied. The laser printer 1 has, within a main case 2, an optical scanning unit 200 having a polygon mirror 220, a feeder portion 4 for feeding a sheet 3 as the recording medium, a process cartridge 17 making up an image forming section for forming an image on the sheet 3 by developing an electrostatic latent image formed by a light beam scanned by the optical scanning unit 200, and a fixing unit 18, as shown in FIG. 1. In FIG. 1, the right side is a front face of the laser printer 1.

A sheet discharge tray 46 disposed on the top of the main case 2 is formed to be recessed with respect to the outer edge of the main case 2 to receive and stack thereon the printed sheet 3. The sheet discharge tray 46 is inclined, in which its inclination is smaller on the fore side (right side in FIG. 1) of the laser printer 1 than the rear side (left side in FIG. 1) of the laser printer 1. Also, a cover 54 is disposed on the front face of the main case 2, and opened or closed to mount or dismount the process cartridge 17.

A sheet discharge path 44 is provided on the rear side (left side in FIG. 1) within the main case 2 so that the sheet 3 fed from the fixing unit 18 provided on the rear side (left side in FIG. 1) within the main case 2 is led to the sheet discharge tray 46 along the dashed line in FIG. 1. A sheet discharge roller 45 for discharging the sheet 3 is provided at an upper end of this sheet discharge path 44.

A feeder portion 4 has a sheet feed roller 8 disposed on the bottom within the main case 2, a sheet feed cassette 6 that can be mounted or dismounted through the front face of the laser printer 1, and a sheet pressing plate 7 disposed within the sheet feed cassette 6 to support and press the sheets 3 against the sheet feed roller 8. Moreover, the feeder portion 4 is provided with a separation pad 9 for separating one sheet 3 in cooperation with the sheet feed roller 8 at the time of sheet feed by being pressed against the sheet feed roller 8, and a conveying roller 11 disposed on the downstream side of the sheet feed roller 8 in the conveying direction of the sheet 3 to convey the sheet 3. Further, the feeder portion 8 is provided with a sheet powder cleaning roller 10 for removing the sheet powder of the sheet 3 when the sheet 3 is conveyed in cooperation with the conveying roller 11, and a registration roller 12 disposed on the downstream side of the conveying roller 11 in the conveying direction of the sheet 3 to adjust the feed timing of the sheet 3 when forming the image.

The sheet pressing plate 7 is rotatable about a support shaft 7a disposed on the bottom face of the sheet feed cassette 6, and urged toward the sheet feed roller 8 by a spring 7b. The sheet feed roller 8 and the separation pad 9 are opposed to each other, and the separation pad 9 is pressed against the sheet feed roller 8 by a spring 13.

The sheet powder produced due to friction between the sheet 3 and the separation pad 9 in feeding the sheet is electrostatically adsorbed to the sheet powder cleaning roller 14 disposed on the downstream side of the separation pad 9 to cooperate with the sheet feed roller 8, and then collected and removed by a sponge 14a. The sheet powder not removed by the sheet powder cleaning roller 14 is removed by a sheet powder cleaning roller 10.

A double-side printing unit 26 is disposed above the sheet feed cassette 6. The double-side printing unit 26 has the reversal conveying rollers 50a, 50b and 50c disposed almost horizontally, and the reversal conveying paths 47a, 47b are disposed at both ends of the double-side printing unit 26. At the time of double-side printing, the sheet 3 is firstly printed on the surface, discharged from the fixing unit 18, and switched back by the sheet discharge roller 45. Then, the switched back sheet 3 is branched from the path of the dashed line in FIG. 1 and conveyed via a reversal conveying path 47a to the double-side printing unit 26. Then, the sheet 3 conveyed to the double-side printing unit 26 is conveyed via a reversal conveying path 47b to the registration roller 12, and is printed on the back face by the image forming section.

A low voltage power supply board 90, a high voltage power supply board 95 and an engine board 85 are disposed above the double-side printing unit 26. To segregate these boards from the fixing unit 18 and the process cartridge 17, a chute 80 is provided above these boards. A guide plate 81 formed on the top of the chute 80 makes up a part of the conveying path for the sheet 3. The chute 80 bridges the main frames (not shown) at the left and right sides of the laser printer 1 while extending in a direction perpendicular to the sheet of FIG. 1 to increase the rigidity of the laser printer 1.

The low voltage power supply board 90 drops a single phase voltage of 100V supplied from the outside of the laser printer 1 to a voltage of 24V which is supplied to each part inside the laser printer 1. Also, the high voltage power supply board 95 generates a high voltage bias applied to each part of the process cartridge 17. The engine board 85 drives various DC motors including a main motor 100 (see FIG. 3) for rotating the photosensitive drum 27 and each roller of the laser printer 1, and drives a solenoid (not shown) for switching the rotation and stop of parts such as the registration roller 12.

The process cartridge 17 making up a part of the image forming section has a drum cartridge 23 and a development cartridge 24 that can be mounted or dismounted on or from the drum cartridge 23. The drum cartridge 23 has a photosensitive drum 27, a Scolotron type charger 29 and a transfer roller 30. The development cartridge 24 has a development roller 31, a supply roller 33 and a toner hopper 34.

The photosensitive drum 27 of the drum cartridge 23 is rotatable in a direction as indicated by the arrow in FIG. 1 in a state contact with the development roller 31. This photosensitive drum 27 has a positively charged organic photosensitive material coated on a conductive substrate, in which a charge generating material is dispersed into a charge transportation layer. When a light beam is applied to the photosensitive drum 27, electric charges arise on the charge generating material due to optical absorption, and are transported through the charge transportation layer to the surface of the photosensitive drum 27 and the conductive substrate When the electric potential on the surface of the photosensitive drum 27 charged by the Scolotron type charger 29 is negated, a potential difference occurs between the potential of irradiated portion and the potential of non-irradiated portion. That is, the light beam is exposed and scanned according to the image data to be written, so that an electrostatic latent image is formed on the photosensitive drum 27.

The Scolotron type charger 29 is disposed a certain distance above the photosensitive drum 27 to be out of contact with the photosensitive drum 27. The Scolotron type charger 29 generates a corona discharge from a discharging wire of tungsten or the like, and is driven by a charging bias circuit (not shown) of the high voltage power supply board 95 to positively charge the surface of the photosensitive drum 27 uniformly.

In a state where the development cartridge 24 is attached on the drum cartridge 23, the development roller 31 is placed on the downstream side of the Scolotron type charge 29 in the rotational direction of the photosensitive drum 27, and rotatable in a direction as indicated by the arrow in FIG. 1. The development roller 31 is made by covering a conductive rubber material around a metallic shaft. A development bias is applied to the development roller 31 by a development bias circuit (not shown) of the high voltage power supply board 95.

The supply roller 33 is disposed on the opposite side of the photosensitive drum 27 across the development roller 31, and rotatable in a direction as indicated by the arrow in FIG. 1.

The supply roller 33 is contacted with the development roller 31. The supply roller 33 is made by covering a conductive foaming material around a metallic shaft, in which the toner supplied to the development roller 31 is frictionally charged. That is, the supply roller 33 is rotated in the same direction (clockwise in FIG. 1) as the development roller 31.

The toner hopper 34 is disposed beside the supply roller 33, in which a developer filled inside the toner hopper 34 is supplied via the supply roller 33 to the development roller 31. In this embodiment, the positively charged toner of nonmagnetic one-component is employed as the developer. This toner may be polymer toner that is produced by copolymerizing more than one species of polymeric monomer, for example, styrene based monomer such as styrene, or acryl based monomer such as acrylic acid, alkyl (C1 to C4) acrylate or alkyl (C1 to C4) methacrylate, by a well known polymerization method such as suspension polymerization. Such polymer toner is mixed with a coloring agent such as carbon black or a wax, and an additive agent such as silica is added to improve fluidity. The particle diameter is about 6 to 10 μm.

An agitator 36 is a coarse net plate extending axially (in the direction perpendicular to the sheet of FIG. 1), and has a cross-sectional shape of a "dogleg character" as shown in FIG. 1. The agitator 36 is rotatable about a rotation axis 35 in a direction as indicated by the arrow in FIG. 1. A film member 36a for rubbing against an inner wall of the toner hopper 34 is provided at a radially outer end of the agitator 36 and a middle abdomen of the "dogleg character". When the agitator 36 is rotated, the toner contained with the toner hopper 34 is agitated.

The transfer roller 30 rotatable in a direction as indicated by the arrow in FIG. 1 is disposed on the downstream side of the development roller 31 in the rotation direction of the photosensitive drum 27. The transfer roller 30 is made by covering an ion conductive rubber material around a metallic shaft. When a toner image on the photosensitive drum 27 is transferred onto the sheet 3, a transfer bias is applied to the transfer roller 30 by a transfer bias circuit (not shown) of the high voltage power supply board 95. The transfer bias means the bias applied to the transfer roller 30 to produce a potential difference between the surface of the photosensitive drum 27 and the surface of the transfer roller 30 so that the toner electrostatically deposited on the surface of the photosensitive drum 27 may be electrically sucked toward the surface of the transfer roller 30.

In this laser printer 1, a so-called cleanerless development system is employed in which after the toner is transferred from the photosensitive drum 27 onto the sheet 3 by the transfer roller 30, the residual toner remaining on the surface of the photosensitive drum 27 is withdrawn by the development roller 31.

The fixing unit 18 making up a part of the image forming section is disposed on the downstream side of the process cartridge 17 in a conveying direction of the sheet 3. The fixing unit 18 has a fixing roller 41, a pressure roller 42 for pressing the fixing roller 41, and a pair of conveying rollers 43 disposed on the downstream side of the fixing roller 41 and the pressure roller 42 in the conveying direction of the sheet 3. The fixing roller 41 is coated with a fluororesin around a hollow aluminum shaft and sintered. A heating halogen lamp 41a is disposed inside the fixing roller 41. The pressure roller 42 is covered with a fluororesin tube around a shaft made of low hardness silicone rubber, and pressed against the fixing roller 41 by a spring (not shown). The toner image transferred on the sheet 3 in the process cartridge 17 is pressurized and heated when the sheet 3 passes between the fixing roller 41 and the pressure roller 42, and fixed on the sheet 3. Then, the sheet 3 is conveyed to the sheet discharge path 44 by the conveying roller 43.

Figure 2:
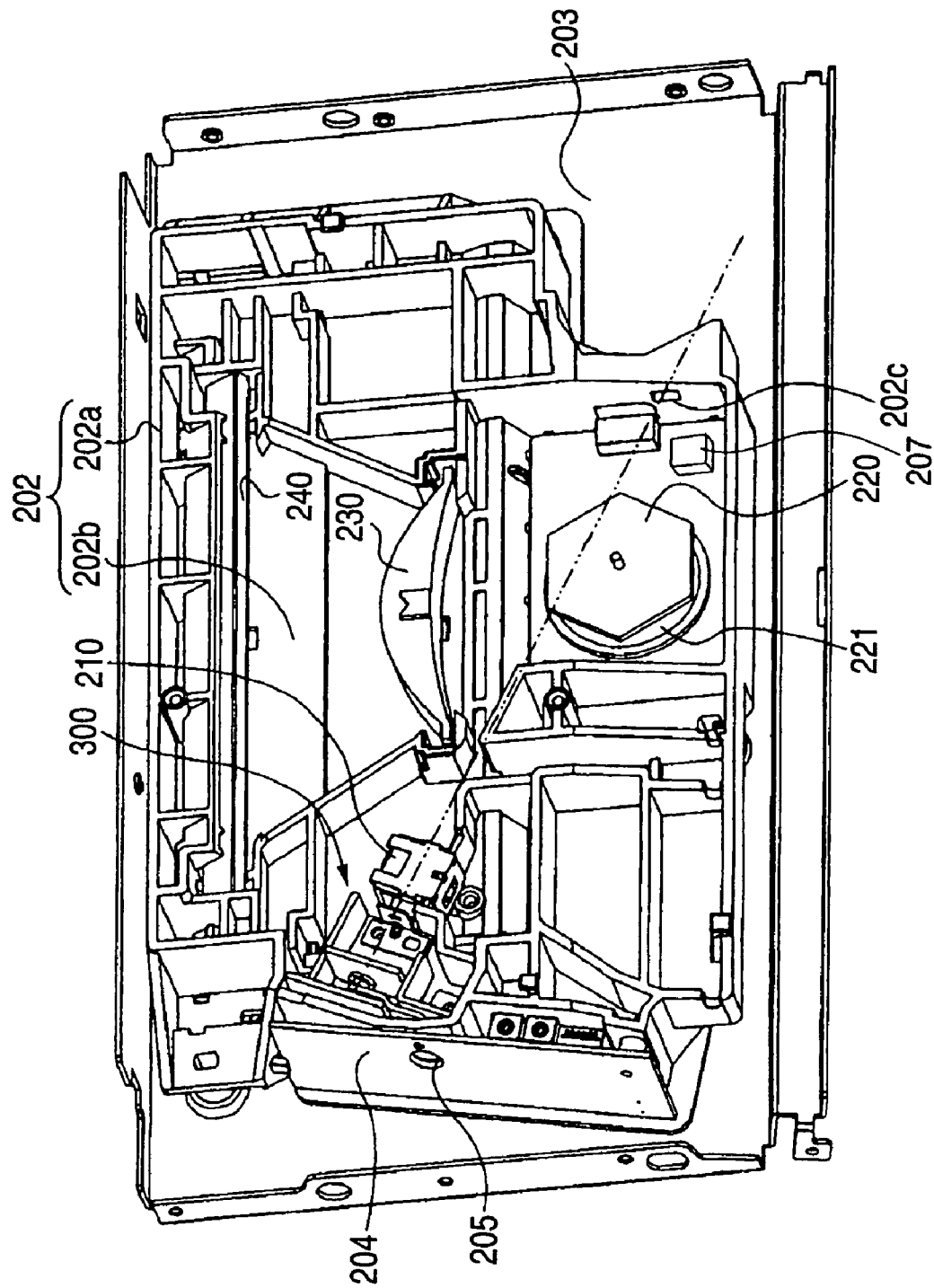
FIG. 2 is a perspective view showing the constitution of an optical scanning unit for the laser printer.

Referring to FIGS. 1 and 2, the optical scanning unit 200 will be described below. FIG. 2 is a perspective view showing the optical scanning unit 200 in a state where an upper lid member 201 is removed, as seen from the right upper in FIG. 1. As shown in FIG. 1, a housing of the optical scanning unit 200 is composed of a scanner frame 202 made of resin mixed with a reinforcing agent such as glass fiber, an upper lid member 201 made of iron to cover its upper part, and a tray 203 made of steel secured by screws to the main frame (not shown) at both the left and right sides of the laser printer 1 to support the scanner frame 202.

The tray 203 is formed like a rectangular shallow box, as shown in FIG. 2. An opening portion 203a (see FIG. 1) for applying a light beam L to the photosensitive drum 27 is provided at an almost central position of the tray 203. The scanner frame 202 is provided with an outer wall 202a extending vertically from the bottom face of the tray 203, and a partition wall 202b extending from near the middle of the outer wall 202a to partition the scanner frame 202 into two upper and lower layers.

A laser unit 300 for emitting a light beam L and a cylindrical lens 210 for refracting the light beam L from the laser unit 300 vertically and forming an image on the polygon mirror 220 are disposed on an upper layer of the scanner frame 202 located on the partition wall 202b. Moreover, the polygon mirror 220 having six reflecting surfaces for reflecting the light beam L, an fθ lens 230 for converting the light beam L reflected from the polygon mirror 220 and scanned at equal angular velocity into equal velocity of scanning, and a mirror 240 for reflecting the light beam L passing through the fθ lens 230 to a lower layer of the scanner frame 202 are disposed on the upper layer of the scanner frame 202.

A mirror 250 for further reflecting the light beam L reflected from the mirror 240, a cylindrical lens 260, and a mirror 270 for reflecting the light beam L passing through the cylindrical lens 260 toward the surface of the photosensitive drum 27 are disposed on the lower layer of the scanner frame 202, as shown in FIG. 1.

Also, a polygon motor 221 for driving and rotating the polygon mirror 220, a circuit board 204 for adjusting the output of light beam emitted from the laser unit 300, and a thermistor 207 for detecting the atmospheric temperature near the polygon mirror 221 are provided within the scanner frame 202 in which the laser unit 300 is placed, and held in the scanner frame 202, as shown in FIG. 2. An adjusting hole 205 is punched in the circuit board 204 to insert a driver when adjusting the optical axis of the laser unit 300. Also, an inspection hole 202c for inspecting the optical axis is provided on a wall face of the scanner frame 202 on the extension line of the optical axis (dashed line in FIG. 2) of the light beam emitted from the laser unit 300 to the polygon mirror 220.

Figure 3:
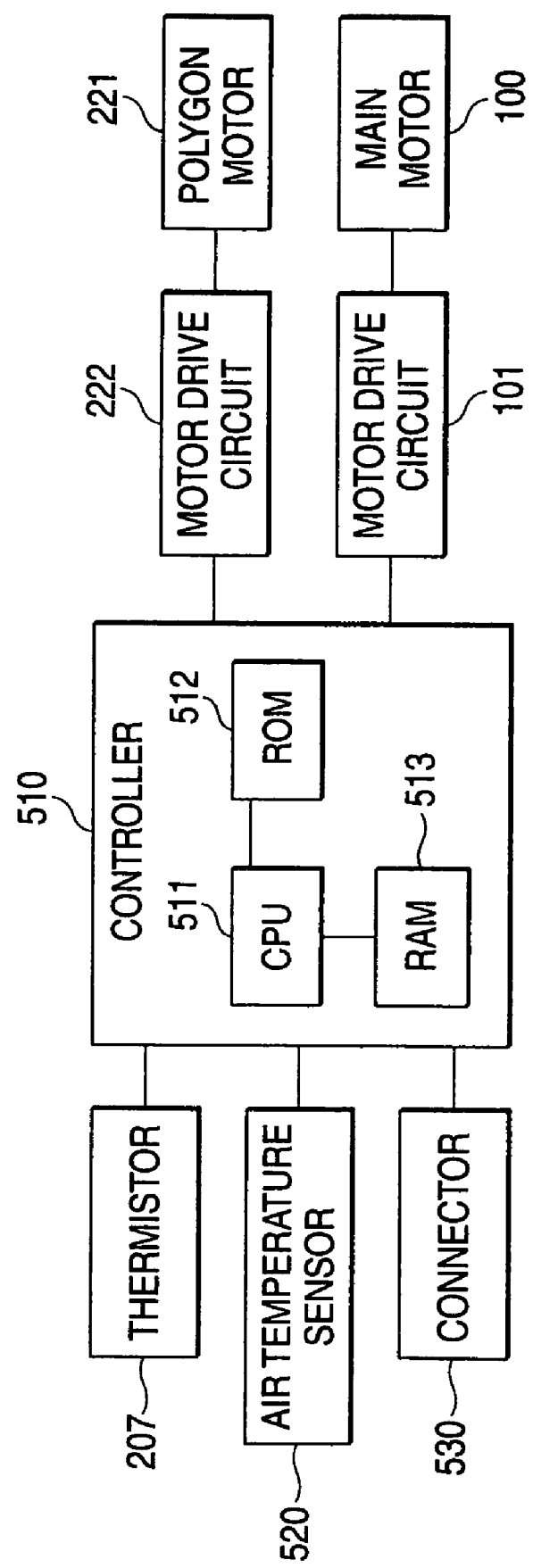
FIG. 3 is a block diagram showing the configuration of a control system for the laser printer.

A control system for the main motor 100 and the polygon mirror 221 will be described below. A main board (not shown) is provided with a controller 510 as shown in FIG. 3. This controller 510 is a well known microcomputer having, as the main parts, a CPU 511, ROM 512 and RAM 513.

This controller 510 is connected to an air temperature sensor 520 for detecting the atmospheric temperature (hereinafter referred to as air temperature) of the laser printer 1, in addition to the thermistor 207, and a connector 530 for reading the image data to be printed from a network or a personal computer. The controller 510 performs the following process, based on the data inputted from these sensors, to drive the main motor 100 via a motor drive circuit 101 and the polygon mirror 221 via a motor drive circuit 222. Though the components related with the following process are only illustrated in FIG. 3, various other sensors are also connected to the controller 510 in practice. Also, the air temperature sensor 520 is provided at a position far away from the fixing unit 18 and near the polygon motor 221, as shown in FIG. 1.

Figure 4:
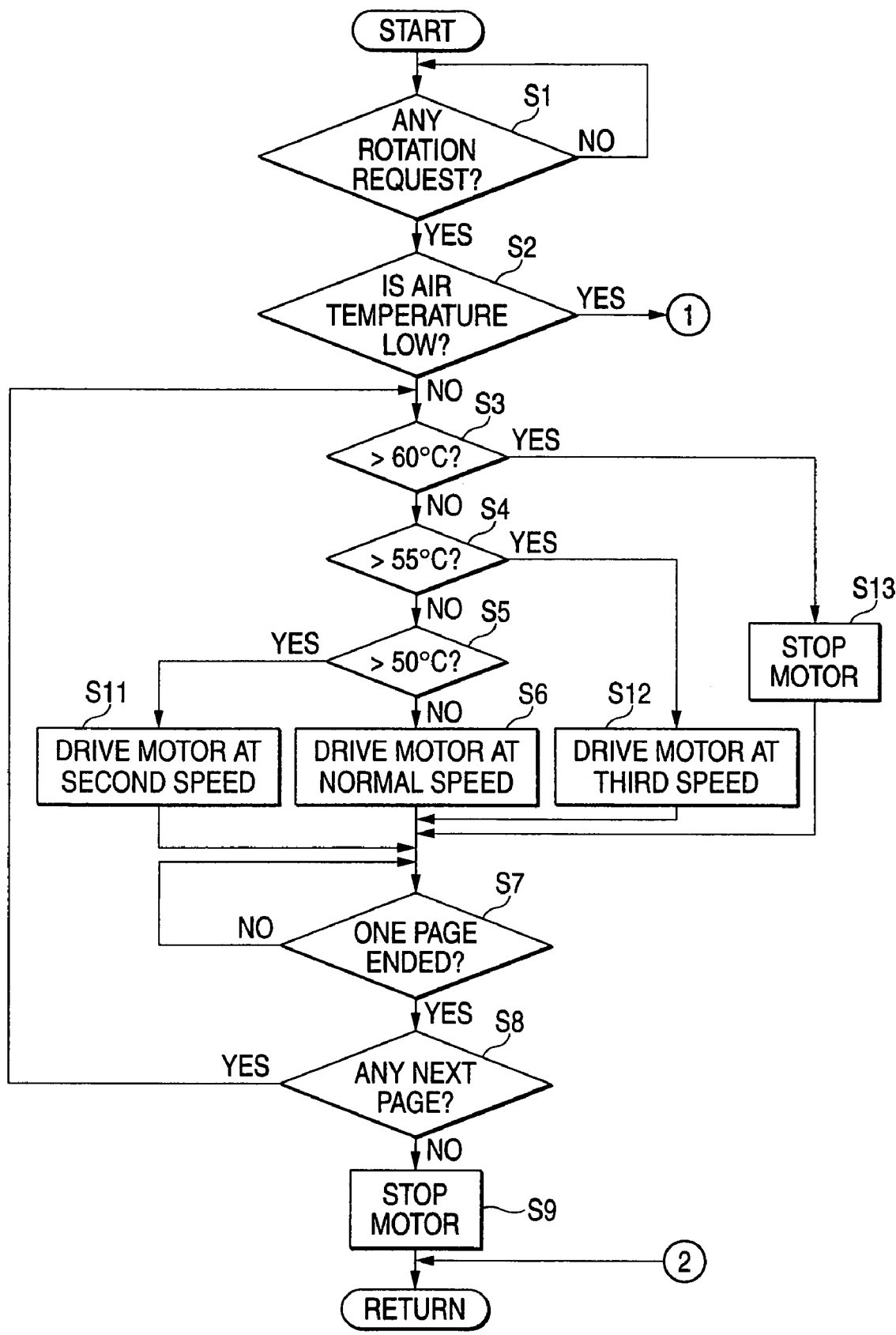
FIG. 4 is a flowchart showing a printing process that is performed in the control system.
Figure 5:
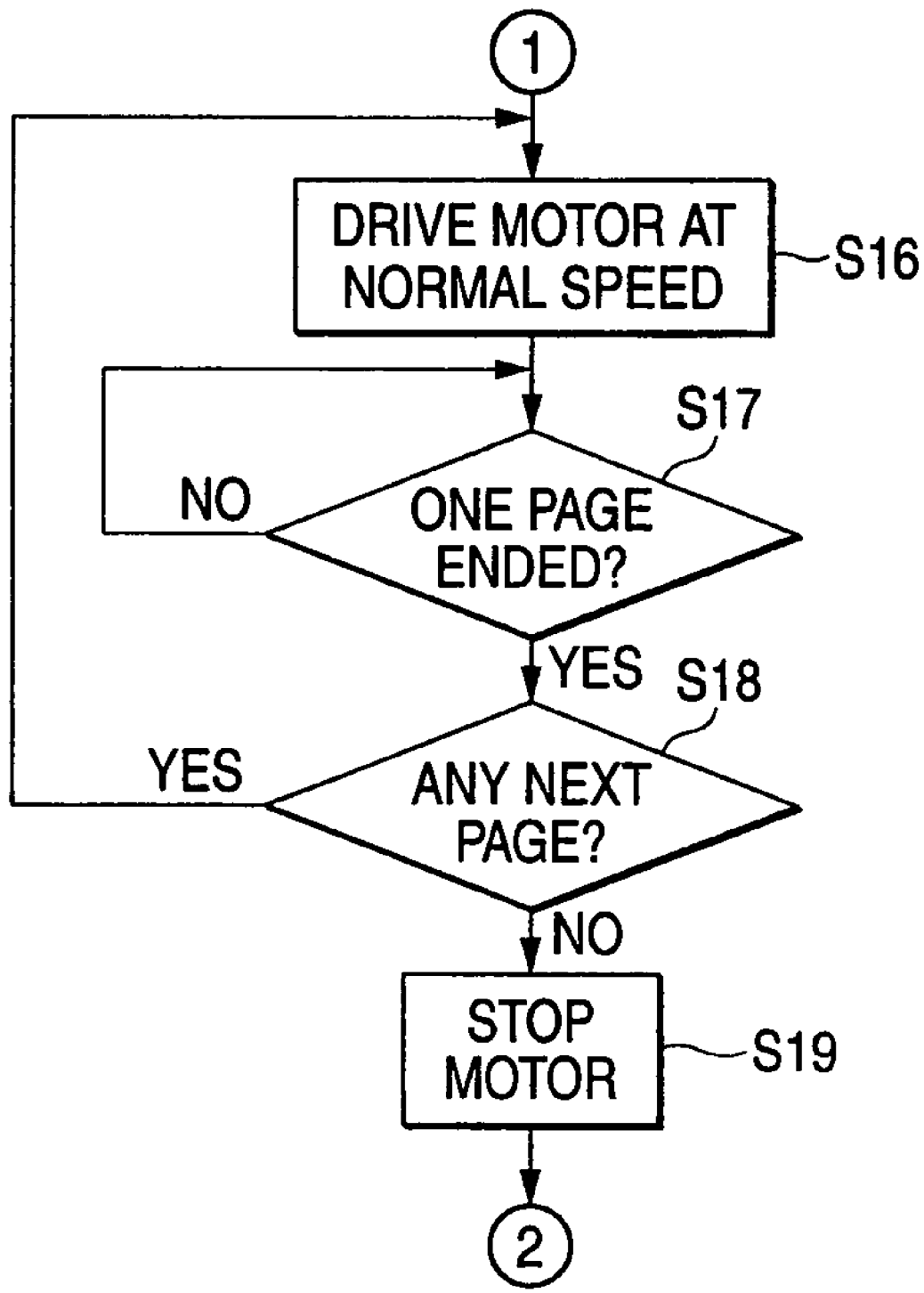
FIG. 5 is a flowchart showing the printing process as continued.

FIGS. 4 and 5 are flowcharts showing a printing process that is performed by the controller 510. The controller 510 repeatedly performs this process after turning on the power. When the process is started, the controller 510 firstly waits for a rotation request to be made at S1 (S denotes a step, same below). That is, when the controller 510 receives the image data via the connector 530, the image data is converted into bit map data through a well known process of another routine, and after the completion of the process, a rotation request of rotating the sheet feed roller 8 is issued. Thus, the controller waits for the rotation request to be made at S1.

When the rotation request is issued (S1: YES), it is determined at S2 whether or not the air temperature is sufficiently low, based on a detection signal from the air temperature sensor 520. When the air temperature is sufficiently low (e.g., lower than 30° C. (corresponding to the first atmospheric temperature)), no process for preventing the polygon mirror 221 from being superheated is required. Thus, if the air temperature is sufficiently low (S2: YES), the operation goes to S16, or if not (S2: NO), the operation continues to S3.

At S3, it is determined whether or not the atmospheric temperature (hereinafter referred to as the temperature of the polygon motor 221) near the polygon mirror 221 exceeds 60° C. (corresponding to the second temperature), based on a detection signal from the thermistor 207. Since the temperature is usually 60° C. or less immediately after the start of printing, a negative determination is made here, and the operation goes to S4. At S4, it is determined whether or not the temperature of the polygon motor 221 exceeds 55° C. (corresponding to the third temperature). Since the temperature is usually 55° C. or less immediately after the start of printing, a negative determination is made here, and the operation goes to S5. At S5, it is determined whether or not the temperature of the polygon motor 221 exceeds 50° C. (corresponding to the first temperature). Since the temperature is usually 50° C. or less immediately after the start of printing, a negative determination is made here, and the operation goes to S6.

At S6, the drive speed of the polygon mirror 221 is set to a normal speed (e.g., 28 ppm), the drive speed of the main motor 100 is set to a corresponding normal speed, and the operation goes to S7. At S7, the controller waits for one page of printing to be ended while driving the polygon motor 221 and the main motor 100 at the normal speeds. When one page of printing is ended (S7: YES), it is determined at S8 whether or not the image data received via the connector 530 contains the next page of data.

When the image data contains the next page of data (S8: YES), the operation transits to S3. This transition timing is almost the same as the timing when the transfer roller 30 finishes conveying the sheet 3 at the previous page. On the other hand, if all the image data has been completely printed and there is no next page of data (S8: NO), the polygon mirror 221 and the main motor 100 are stopped successively at S9, and the process is once ended. When the amount of image data is small, the printing is usually continued at the normal speed while repeating the processing of S3, S4, S5, S6, S7 and S8. When the printing is ended, each motor is stopped (S9).

However, when the amount of image data is large, the temperature of the polygon mirror 221 rises during the printing. Particularly, nowadays when the high speed printing at high pixel density is required, this problem is significant. Thus, the following process is performed in this embodiment.

That is, if the temperature of the polygon mirror 221 exceeds 50° C. during the printing (S5: YES), the operation goes to S11, where the drive speed of the polygon motor 221 is set to the second speed (e.g., 24 ppm), and the drive speed of the main motor 100 is set to the corresponding second speed. Then, the printing is performed at the second speed during the process following S7, whereby the temperature elevation of the polygon motor 221 is relieved.

Also, if the temperature of the polygon mirror 221 exceeds 55C during the printing (S4: YES), the operation goes to S12, where the drive speed of the polygon motor 221 is set to the third speed (e.g., 20 ppm), and the drive speed of the main motor 100 is set to the corresponding third speed. Then, the printing is performed at the third speed during the process following S7, whereby the temperature elevation of the polygon motor 221 is further relieved.

Moreover, if the temperature of the polygon mirror 221 during the printing exceeds 60° C. that is its critical operation temperature (S3: YES), the polygon motor 221 and the main motor 100 are stopped at S13, and the operation goes to S7. In this case, each motor is stopped and the printing does not proceed, whereby a standby state at S7 is continued. In this case, after the polygon motor 221 is cooled, the user performs a well known reset operation, whereby the process of this routine is performed again from S1, and if the temperature of the polygon motor 221 is 60° C. or less, the printing is performed.

Also, if the temperature of the polygon motor 221 during the printing at the third speed (S12) drops to 55° C. or below (S4: NO), the printing is performed by switching to the normal speed or the second speed (S6 or S11). Moreover, if the temperature of the polygon mirror 221 during the printing at the second speed (S11) drops to 50° C. or below (S5: NO), the printing is performed by switching to the normal speed (S6).

Through the above process, the polygon motor 221 is effectively prevented from being superheated. And since the drive speed is reduced stepwise according to the actual temperature of the polygon motor 221, the printing is performed at as high speed as possible. Moreover, when the temperature of the polygon mirror 221 falls, the drive speed is increased from the third speed to the second speed and from the second speed to the normal speed, whereby the printing is further sped up. Also, the switching of the drive speed occurs after the printing of one page and before the printing of the next page (i.e., when the sheet 3 is not opposed to the transfer roller 30) (see S7), and the speed of the polygon mirror 221 and the speed of the main motor 100 are changed at the same time, whereby the image formation (printing) is made more excellently.

On the other hand, when the air temperature is sufficiently low, and there is no fear that the polygon motor 221 is superheated (S2: YES), the same processing (S16 to S19) of S6 to S9 is performed without referring to the detection signal of the thermistor 207, as shown in FIG. 5. That is, at S16 the drive speed of the polygon motor 221 is set to the normal speed, and the drive speed of the main motor 100 is set to the corresponding normal speed. At S17, the controller waits for one page of printing to be ended while driving the polygon motor 221 and the main motor 100 at the normal speeds. When one page of printing is ended (S17: YES), it is determined whether or not the image data contains the next page of data (S18). When the image data contains the next page of data (S18: YES), the operation goes to S16 to continue printing at the normal speed. When all the pages have been completely printed (S18: NO), each motor is stopped (S19), and the process is once ended. In this way, in this embodiment, when the air temperature is sufficiently low and there is no fear that the polygon motor 221 is superheated, the excess process is omitted.

In this embodiment, the photosensitive drum 27 functions as the photosensitive body, the development roller 31 functions as the development section, the transfer roller 30 functions as the transfer section, the laser unit 300 functions as the light source, the polygon mirror 220 functions as the deflection section, the polygon motor 221 functions as the driving section, the thermistor 207 functions as the temperature detecting section, the controller 510 functions as the controller, the main motor 100 functions as the second driving section, the air temperature sensor 520 functions as the atmospheric temperature detecting section, and the scanner frame 202 functions as the housing.

This invention is not limited to the above embodiment, but may be implemented in various other forms without departing from the spirit or scope of the invention. For example, when the temperature of the polygon mirror 221 exceeds 60° C., or immediately before 60° C., the drive speed of the polygon mirror 221 may be further reduced. If the speed is reduced excessively, the control of the polygon mirror 221 becomes difficult. Thus, the speed is changed in a range up to 30% in the embodiment. Accordingly, the control of the polygon motor 221 becomes easier in this embodiment.

Also, when the detected temperature of the thermistor 207 at the time of power on is regarded as the air temperature at that time, the air temperature sensor 520 may be eliminated and the detected temperature of the thermistor 207 may be employed as the air temperature. Further, the temperature of the polygon mirror 221 may be detected directly from the impedance of a coil for the polygon mirror 221 or the housing temperature of the polygon motor 221, and the drive speed may be switched based on its temperature, as previously described. Furthermore, the deflection section is not limited to the polygon mirror but may be implemented in various forms.

What is claimed is:

1. An image forming apparatus comprising:
a photosensitive body;
an optical scanning unit configured to deflect and scan a light on the photosensitive body to form an electrostatic latent image on a surface of the photosensitive body, the optical scanning unit comprising:
a light source that emits the light;
a deflection section that deflects the emitted light;
a driving section that drives the deflection section; and
a first temperature detecting section that detects a temperature of the driving section or a temperature in vicinity of the driving section;
a developing section that develops the electrostatic latent image by depositing a developer on the electrostatic latent image formed on the surface of the photosensitive body by the optical scanning unit;
a transfer section that transfers the developer deposited on the surface of the photosensitive body by the developing section to a recording medium;
a controller configured to change a drive speed of the driving section based on the temperature detected by the first temperature detecting section; and
a second temperature detecting section that detects an atmospheric temperature of the image forming apparatus, the second temperature detecting section being disposed in the image forming apparatus,
wherein the controller makes no control of changing the drive speed of the driving section when the atmospheric temperature detected by the second temperature detecting section is lower than a predetermined atmospheric temperature.

2. The image forming apparatus according to claim 1, wherein the controller reduces the drive speed of the driving section from a first speed to a second speed that is slower than the first speed, when the temperature detected by the first temperature detecting section exceeds a first temperature.

3. The image forming apparatus according to claim 2, wherein the controller stops the driving section, when the temperature detected by the first temperature detecting section exceeds a second temperature as a critical operation temperature of the driving section that is higher than the first temperature.

4. The image forming apparatus according to claim 3, wherein the controller reduces the drive speed of the driving section from the second speed to a third speed that is slower than the second speed, when the temperature detected by the first temperature detecting section exceeds a third temperature that is higher than the first temperature and lower than the second temperature.

5. The image forming apparatus according to claim 2, wherein the controller sets the drive speed of the driving section to the first speed again, when the temperature detected by the first temperature detecting section is below the first temperature.

6. The image forming apparatus according to claim 1, further comprising a second driving section that drives the photosensitive body;
wherein the controller changes the drive speed of the second driving section in accordance with the changed drive speed of the driving section.

7. The image forming apparatus according to claim 1, wherein the controller reduces the drive speed of the driving section by up to 30%.

8. The image forming apparatus according to claim 1, wherein the transfer section transfers the developer onto the recording medium conveyed one by one to its opposite position; and
the controller changes the drive speed at the timing when the recording medium is not opposed to the transfer section while the recording medium is being conveyed one by one.

9. The image forming apparatus according to claim 1, wherein the optical scanning unit comprises a housing for holding the driving section, and the first temperature detecting section is a thermistor held on the housing.

10. The image forming apparatus according to claim 1, wherein the second temperature detecting section is configured to detect the atmospheric temperature of the image forming apparatus at least at a time of power on of the image forming apparatus.

11. An image forming apparatus comprising:
a photosensitive body;
an optical scanning unit configured to scan a light on the photosensitive body to form an electrostatic latent image on a surface of the photosensitive body, the optical scanning unit including a first temperature detecting section that detects the temperature of the optical scanning unit or the temperature in vicinity of the optical scanning unit:
a developing section that develops the electrostatic latent image by depositing a developer on the electrostatic latent image formed on the surface of the photosensitive body by the optical scanning unit;

a transfer section that transfers the developer deposited on the surface of the photosensitive body by the developing section to a recording medium;

a controller that changes a drive speed of the optical scanning unit based on the temperature detected by the first temperature detecting section; and a second temperature detecting section that detects an atmospheric temperature of the image forming apparatus, the second temperature detecting section being disposed in the image forming apparatus and separated from the first temperature detection section, wherein the controller makes no control of changing the drive speed of the driving section when the atmospheric temperature detected by the second temperature detecting section is lower than a predetermined atmospheric temperature.

12. The image forming apparatus according to claim 11, wherein the optical scanning unit comprises a housing; and the first temperature detecting section is disposed in the housing.

13. The image forming apparatus according to claim 11, wherein the second temperature detecting section is configured to detect the atmospheric temperature of the image forming apparatus at least at a time of power on of the image forming apparatus.

* * * * *